United States Patent [19]

Ikegame et al.

[11] Patent Number: 4,991,161
[45] Date of Patent: Feb. 5, 1991

[54] APPARATUS FOR SUPPORTING OBJECTIVE LENS MOVABLY IN TWO ORTHOGONAL DIRECTIONS

[75] Inventors: Tetsuo Ikegame; Ichiro Ikari, both of Hachioji, Japan

[73] Assignee: Olympus Optical Co., Ltd., Japan

[21] Appl. No.: 330,380

[22] Filed: Mar. 29, 1989

[30] Foreign Application Priority Data

Mar. 29, 1988 [JP] Japan ............................ 63-75765

[51] Int. Cl.$^5$ ......................... G02B 7/02; G11B 7/00
[52] U.S. Cl. .......................... 369/44.150; 369/44.160; 369/119; 350/247
[58] Field of Search ................. 369/43, 44.15, 44.16, 369/119, 215, 244, 253, 256; 350/6.3, 247, 252, 255, 571

[56] References Cited

U.S. PATENT DOCUMENTS

| | | | |
|---|---|---|---|
| 4,592,037 | 5/1986 | Ohnuki | 369/44.15 |
| 4,646,283 | 2/1987 | Ito et al. | 318/256 |
| 4,750,164 | 6/1988 | Nose | 369/44.15 X |
| 4,782,475 | 11/1988 | Chandler | 369/44.15 |
| 4,842,392 | 6/1989 | Nakamura et al. | 350/252 X |
| 4,878,214 | 10/1989 | Hinotani | 369/256 |

FOREIGN PATENT DOCUMENTS

60-197942 10/1985 Japan.

*Primary Examiner*—Bentsu Ro
*Attorney, Agent, or Firm*—Parkhurst, Wendel & Rossi

[57] ABSTRACT

An apparatus for supporting an objective lens projecting a light beam upon an optical record disc having a data track recorded therein, movably in a focusing direction parallel to an optical axis of the objective lens as well as in a tracking direction perpendicular both to the optical axis and to the track in order to effect focusing and tracking servo controls, including four resilient wires arranged between a lens holder and a stationary base member, said resilient wires being not in parallel with each other. Two resilient wires provided nearer to the optical record disc are arranged such that extensions of these wires intersect with each other at a first point to make a first apex angle and the remaining two wires are arranged such that extensions of these wires intersect with each other at a second point to form a second apex angle, the first and second points being aligned in the focusing direction and the first apex angle being smaller than the second apex angle.

8 Claims, 8 Drawing Sheets

FIG_4

FIG_5

FIG_6

FIG_7

FIG_9

FIG_10

FIG_11

FIG_14

FIG_15

FIG_16

APPARATUS FOR SUPPORTING OBJECTIVE LENS MOVABLY IN TWO ORTHOGONAL DIRECTIONS

BACKGROUND OF THE INVENTION

Field of the Invention and Related Art Statement

The present invention relates to an apparatus for supporting an objective lens movably in two substantially orthogonal directions, and more particularly to an apparatus for supporting an objective lens provided in an optical pick-up movably in a focusing direction parallel to an optical axis of the objective lens and a tracking direction perpendicular both to the optical axis of the objective lens and to a tangential direction along which a signal track is formed on an optical disc such as compact disc and video disc and opto-magnetic disc.

Such an objective lens supporting apparatus has been widely used in the optical pick-up in various kinds of optical information processing apparatuses such as compact disc player, video disc player and opto-magnetic data recording and reproducing apparatus. In the known optical pick-up, a recording light beam is made incident upon a record medium by means of the objective lens in a focused condition, and a light flux reflected by the record medium is detected by a photodetector via the objective lens. In this case, in order to reproduce the information signal precisely, a light spot formed on the record medium should trace or follow the information track in an accurate manner. To this end, there are provided a focusing servo control mechanism for moving the light spot in the direction of the optical axis of the objective lens and a tracking servo control mechanism for shifting the light spot in the tracking direction.

Figure 1:
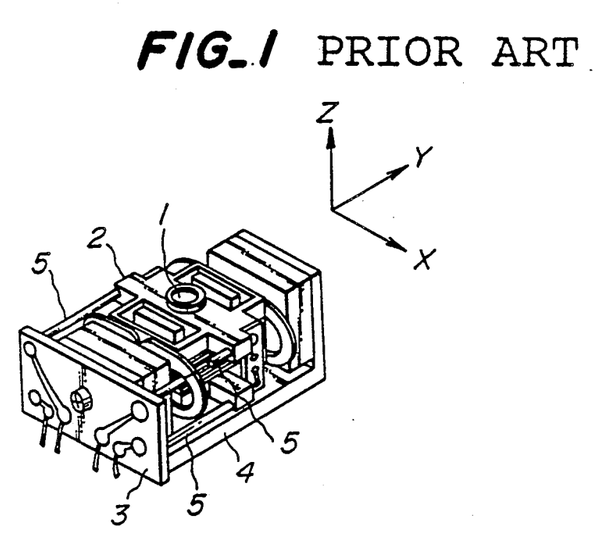
FIG. 1 is a perspective view showing an embodiment of the known optical pick-up apparatus comprising four parallel supporting wires.

There has been proposed as optical pick-up for effecting the above mentioned focusing and tracking controls by moving the objective lens in the focusing and tracking directions in accordance with focusing and tracking errors, respectively. For instance, in an U.S. Pat. No. 4,646,283 issued to M. Ito et al on Feb. 24, 1987, there is disclosed an optical pick-up in which a lens holder having the objective lens secured thereto is supported by means of four resilient wires movably in the focusing and tracking directions. FIG. 1 is a perspective view illustrating this known pick-up including the four resilient wires. The pick-up comprises an objective lens 1 which is secured to a lens holder 2, a stationary member 3 secured to a base member 4, and four resilient wires 5. The resilient wires 5 may be formed by, for instance, piano wires. The resilient wires 5 are arranged in parallel with each other and are extended in a tangential direction Y which is parallel to the direction of the information track formed on the optical record disc not shown. Therefore, the lens holder 2 and thus the objective lens 1 can be moved both in the focusing direction Z and in the tracking direction X. In the apparatus shown in FIG. 1, there are also provided moving coils secured to the lens holder 2 and permanent magnets for generating magnetic fluxes passing through the moving coils to produce forces for driving the lens holder 2 in the focusing and tracking directions. Since such an electro-magnetic actuator has been well known in the art and is not concerned with the subject matter of the present invention, its detailed construction and function are omitted here.

In the known optical pick-up apparatus shown in FIG. 1, the lens holder 2 is liable to rotate about the tangential axis Y and the optical axis of objective lens 1 is inclined, when the lens holder is moved in the tracking direction X. This is due to the fact that the spring constant for the tilting motion about the tangential direction Y which relates to the resistance against the bending motion of the wires is substantially smaller than that about the tracking direction X which relates to the resistance against the shrinkage and extension of the wires. Further, since the four resilient wires 5 are arranged in parallel with each other, the lens holder 2 is liable to be vibrated at undesired resonance frequency. Moreover, the lens holder 2 is liable to be affected by external force to a great extent. Due to the above mentioned undesired phenomena, the focusing and tracking servo controls could not be carried out precisely, and thus the information signal could not be read out or recorded accurately.

Figure 2:
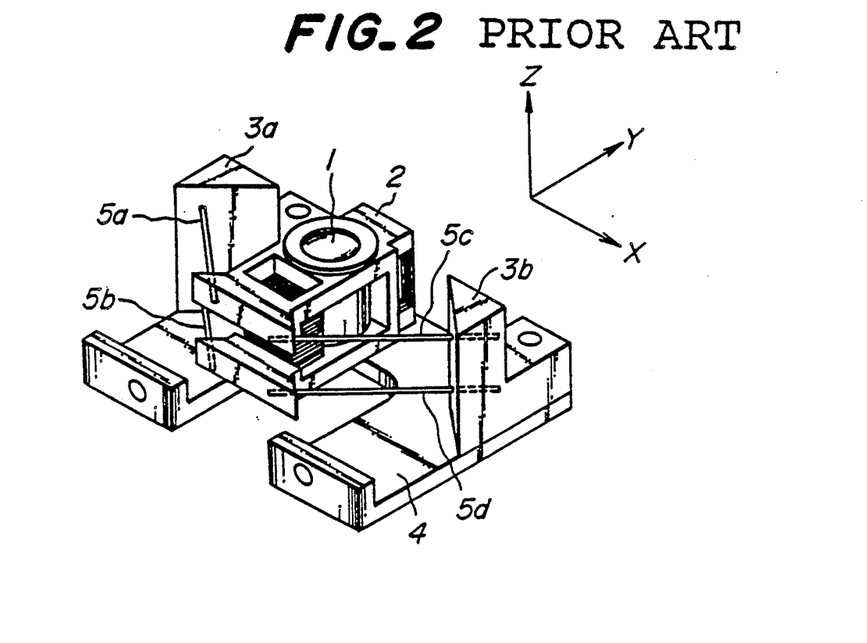
FIG. 2 is a perspective view illustrating another embodiment of the known pick-up apparatus including four non-parallel supporting wires.

In order to avoid the above mentioned drawbacks of the known optical pick-up shown in FIG. 1 in which the four resilient wires are arranged in parallel with each other in the tangential direction Y, there has been proposed another known optical pick-up in which four resilient wires are arranged in a non-parallel manner. Such a known optical pick-up is described in Japanese Patent Application Publication Kokai-Sho 60-197,942. FIG. 2 is a perspective view showing this known optical pick-up apparatus. In FIG. 2 portions similar to those of FIG. 1 are denoted by the same reference numerals used in FIG. 1. An objective lens 1 is supported by a lens holder 2 and the lens holder is supported by a stationary members 3a and 3b by means of four resilient wires 5a, 5b, 5c and 5d. As illustrated in FIG. 2, the two wires 5a and 5b are arranged in parallel with each other and the two wires 5c and 5d are arranged in parallel with each other, but the wires 5a, 5b are not in parallel with the wires 5c, 5d, respectively viewed in the focusing direction Z. That is to say, extensions of the wires 5a and 5c make an angle substantially equal to 90° and the wires 5b and 5d make the same angle. It should be noted that the wires 5a and 5c situate in the same plane viewed in the plane perpendicular to the focusing direction Z and, similarly the wires 5b and 5d are existent in the same plane perpendicular to the focusing direction Z. The known optical pick-up depicted in FIG. 2, the lens holder 2 is hardly tilted about the tangential direction Y and is hardly influenced by the external force, so that the focusing and tracking servo controls can be performed in an accurate manner.

In the data processing apparatus using the optical record disc, particularly the opto-magnetic disc, it is required to utilize the disc at a high efficiency to make a data record area as wide as possible. Therefore, it is advantageous to record the data signal up to a region as close as possible to a center of the disc. To this end, a turntable on which the record disc is placed and is rotated is designed to have a diameter as small as possible, so that the optical pick-up can be moved toward the center of the disc as close as possible. However, in the known optical pick-up shown in FIG. 2, since the wires 5a to 5d are not arranged in parallel with each other, the space which the wires occupy becomes large and thus the pick-up could not be moved much closer to the center of the record disc, otherwise the wires would interfere with the turntable. Therefore, the utilization efficiency of the record disc would be decreased and an amount of data which can be recorded on the record disc is limited.

Further, in many optical pick-ups, there is provided a device for detecting the position of the objective lens in the tracking direction. In this device, a light shielding member or plate is secured to the lens holder and a light source and a light detector are arranged on the base member such that an amount of the light flux emitted from the light source toward the light detector and being shielded by the shielding plate is changed in accordance with the position of the lens holder relative to the base member. Usually the shielding plate is secured to the lens holder near a portion at which the resilient wire is secured to the lens holder, so that the dimension of the optical pick-up viewed in the tracking direction X is liable to be large, because the shielding plate has to be arranged not to interfere with the resilient wire.

SUMMARY OF THE INVENTION

The present invention has for its object to provide a novel and useful apparatus for supporting the objective lens movably in the two directions, e.g. in the focusing direction and the tracking direction perpendicular to the focusing direction, in which the objective lens can be moved in a precise manner without generating any undesired tilting movement of the optical axis of the objective lens and resonance vibration and further the apparatus can be moved in a given direction as far as possible without causing the interference with any other parts situating near the apparatus.

According to the invention, an apparatus for supporting an objective lens movably in two substantially orthogonal directions, comprises a lens holder to which the objective lens is secured such that an optical axis of the objective lens is aligned with said first direction; a stationary member for supporting the lens holder; and a first pair of resilient wires and a second pair of resilient wires arranged between the lens holder and the stationary member, said first pair of resilient wires being arranged closer to said object than said second pair of resilient wires, said resilient wires being extended not in parallel with each other such that the resilient wires or extensions of the wires intersecting with each other at points which are aligned with each other in the first direction, and said resilient wires being arranged symmetrically with respect to a plane which includes the optical axis of the objective lens and is perpendicular to the second direction or with respect to an axis which is perpendicular both to the optical axis of the objective lens and the second direction.

DETAILED EXPLANATION OF THE EMBODIMENTS

Figure 3:
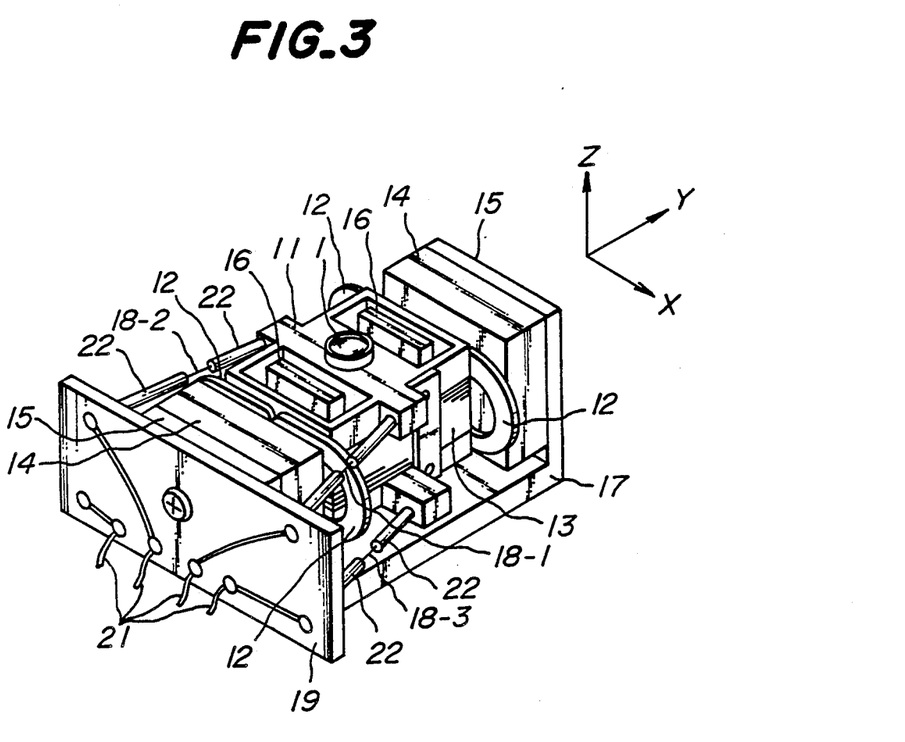
FIG. 3 is a perspective view depicting a first embodiment of the objective lens supporting apparatus according to the present invention.

FIG. 3 is a perspective view showing a first embodiment of the objective lens supporting apparatus according to the invention. An objective lens 1 is secured to a lens holder 11 to which are secured four tracking coils 12 and a focusing coil 13 which is wound around an outer side wall of the lens holder. In the lens holder 11 there are formed through holes into which are inserted inner yokes 16 which are formed integrally with a base member 17 made of magnetic material. The base member 17 further has outer yokes 15 formed integrally therewith. Permanent magnets 14 are secured to the outer yokes 15 such that the magnets are positioned between the inner and outer yokes. These yokes and magnets constitute two magnetic circuits for generating magnetic fluxes passing through parts of the tracking and focusing coils 12 and 13. That is to say, the magnetic flux is commonly utilized for the tracking and focusing controls. To the outer yoke 15 is fixed a printed circuit plate 19, and the lens holder 11 is coupled with the printed circuit plate 19 by means of four resilient wires 18-1 to 18-4 which are made of metal wire such as piano wire. In this manner, the lens holder 11 and thus the objective lens 1 are supported by the wires movably in two orthogonal directions, i.e. the tracking direction X and the focusing direction Z. In the present embodiment, the resilient wires 18-1 to 18-4 are utilized as electrical conductors for supplying tracking and focusing control signals to the tracking and focusing coils 12 and 13, respectively. Therefore, lead wires 21 are connected to the resilient wires 18-1 to 18-4 via printed conductors formed on the printed circuit plate 19. Further, in order to prevent undesired resonance vibration, the wires 18-1 to 18-4 are inserted into rubber tubes 22 serving as damping members.

Figure 4:
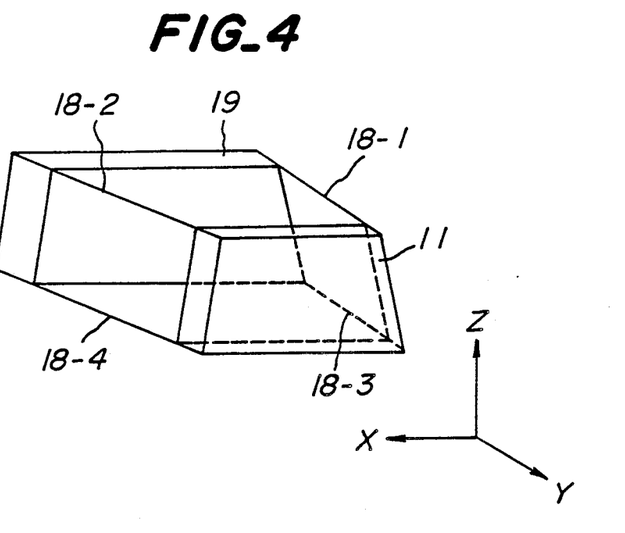
FIG. 4 is a schematic perspective view showing the arrangement of four resilient supporting wires in the apparatus shown in FIG. 3.
Figure 5:
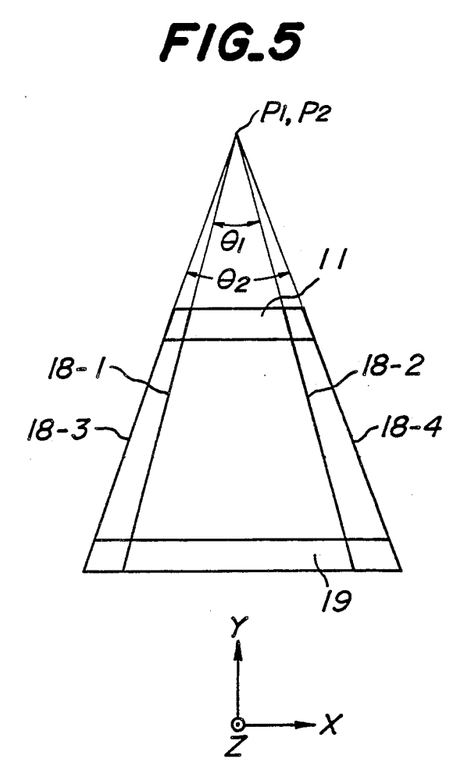
FIG. 5 is a schematic view of the wires viewed in the direction of an optical axis of the objective lens.
Figure 6:
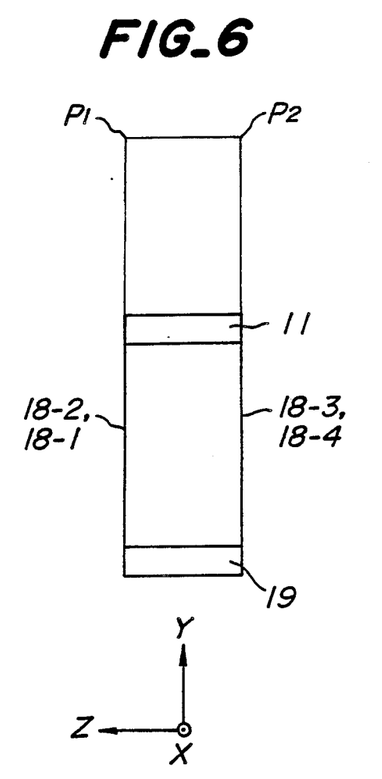
FIG. 6 is a schematic view of the wires viewed in the tracking direction.

FIG. 4 is a schematic perspective view illustrating the arrangement of the lens holder 11, resilient wires 18-1 to 18-4 and printed circuit plate 19. Since the printed circuit plate 19 serves as a stationary member for the lens holder 11, it is sometimes called the stationary member. FIG. 5 is a plan view showing schematically the wire arrangement viewed in the direction of the optical axis of the objective lens 1 i.e. the focusing direction Z, and FIG. 6 is a side view depicting also schematically the wire arrangement viewed in the tracking direction X. In the present embodiment, all the wires 18-1 to 18-4 are not in parallel with each other viewed in the focusing direction Z which is parallel with the optical axis of the objective lens as shown in FIG. 5, but are in parallel with each other viewed in the tracking direction X as illustrated in FIG. 6. Further, the resilient wires 18-1 and 18-2 situating nearer to the turntable and the record medium than the wires 18-3 and 18-4 are inclined with respect to the tangential direction Y, i.e. the information track direction, so that extension lines of these wires 18-1 and 18-2 intersect with each other at a point $P_1$ and make an apex angle $\theta_1$, and similarly the wires 18-3 and 18-4 are inclined with respect to the tangential direction Y such that extension lines of these wires are crossed with each other at a point $P_2$ and make an apex angle $\theta_2$. As can be clearly shown in FIG. 5, the apex angle $\theta_1$ is smaller than the apex angle $\theta_2$. This means that according to the present invention, the wires 18-1 and 18-2 are arranged much closer to the optical axis of the objective lens 1. Moreover, as can be understood from FIG. 6, the points $P_1$ and $P_2$ are aligned with each other in the focusing direction Z. That is to say, a line segment connecting these points $P_1$ and $P_2$ is in parallel with the optical axis of the objective lens.

Figure 7:
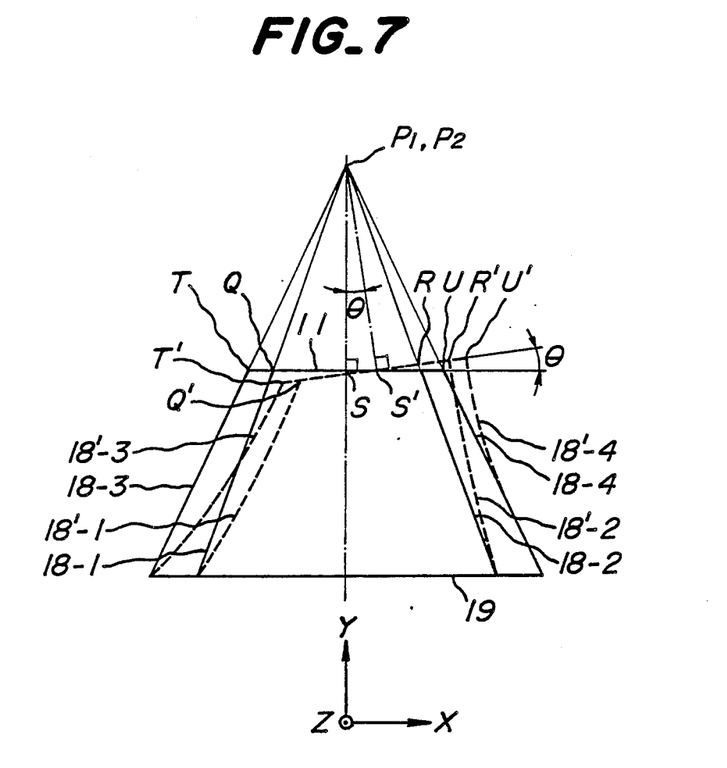
FIG. 7 is a schematic view illustrating the deformation of the wires in case of effecting the tracking control.

Now the operation of the objective lens supporting apparatus shown in FIG. 3 will be explained with reference to FIG. 7. When the tracking control signal is supplied to the tracking coils 12, the lens holder 11 is moved substantially in the tracking direction X, and when the focusing control signal is supplied to the focusing coil 13, the lens holder 11 is moved substantially in the focusing direction Z, so that the tracking and focusing servo controls are carried out. During the tracking and focusing controls, the resilient supporting wires 18-1 to 18-4 are deformed in the manner explained hereinbelow. Now it is assumed that only the tracking coils 12 are energized, then the wires 18-1 and 18-2 are bent into configuration shown by broken lines 18'-1 and 18'-2, so that the lens holder is rotated about the line connecting the points $P_1$ and $P_2$. That is to say, a line segment $P_1S_1$ which perpendicularly bisects a line segment QR which connects points Q and R, at which the wires 18-1 and 18-2 are secured to the lens holder 11, is rotated about the point $P_1$ by an angle $\theta$ and the segment QR is shifted into a line segment Q'R'. The remaining wires 18-3 and 18-4 are deformed in the same manner as that explained above and a line segment $P_2S_2$ perpendicularly bisecting a line segment TU which connects points T and U, at which the wires 18-3 and 18-4 are secured to the lens holder 11, is rotated by the same angle $\theta$, and the line segment TU is shifted into a segment T'U'. In this manner, when the lens holder 11 is moved in the tracking direction X under the tracking servo control, the lens holder is not tilted with respect to the focusing direction Z. In other words, the lens holder 11 is moved in a plane parallel to the XY plane, so that the property of the objective lens is not changed under the tracking servo control.

As explained above, according to the invention, the apex angle $\theta_1$ formed between the wires 18-1 and 18-2 is smaller than the apex angle $\theta_2$ formed between the wires 18-3 and 18-4. Therefore, the spring constant of a first pair of wires 18-1 and 18-2 might differ from that of a second pair of wires 18-3 and 18-4. In such a case, it is preferable to make these spring constants identical with each other by suitably selecting effective length, cross sectional configuration, etc. of the wires.

Figure 8A:
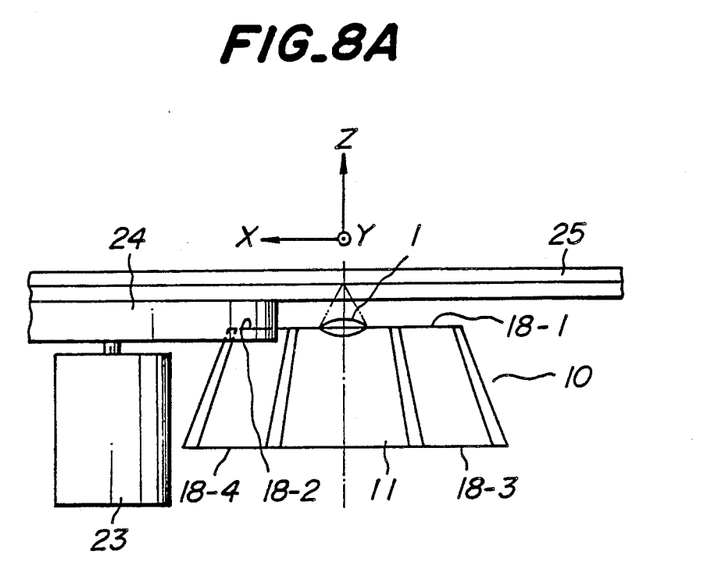
FIGS. 8A and 8B are side and plan views, respectively showing a relative positional relation of the optical pick-up including the objective lens supporting apparatus according to the invention with respect to the turntable and the record disc.
Figure 8B:
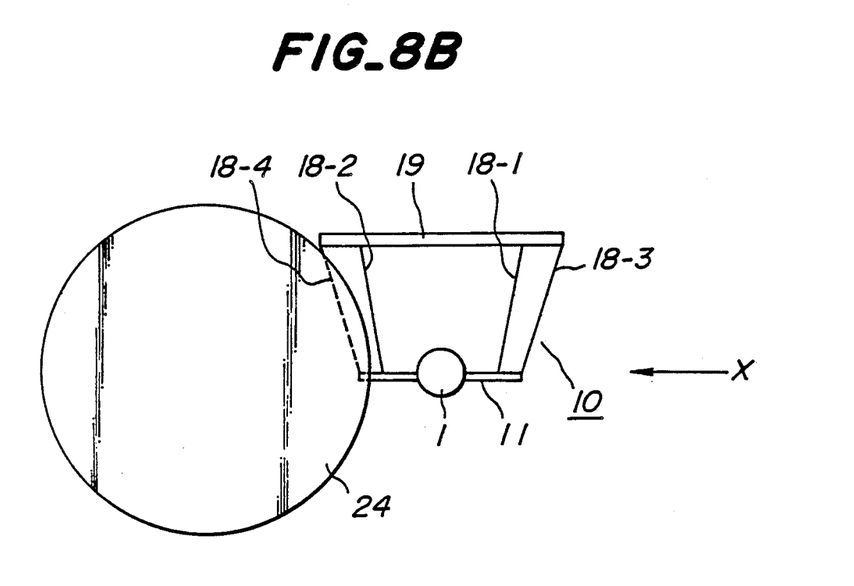

FIGS. 8A and 8B are side and plan views, respectively showing the positional relation between the optical pick-up including the objective lens supporting apparatus according to the invention and a turntable 24 rotated by a motor 23 and an optical record disc 25. According to the invention, the resilient wires 18-1 and 18-2 which situate near the turntable 24 are arranged nearer to the optical axis of the objective lens 1 than the second pair of the wires 18-3 and 18-4, so that the pick-up 10 can be moved nearer to the rotational axis of the turntable without causing undesired contact of the wire 18-2 with the turntable. Therefore, the pick-up 10 can be moved closer to the center of the optical record disc 25 and a wider area of the record disc can be utilized for storing the data signal.

Moreover, the point R at which the wire 18-2 is secured to the lens holder 11 is made nearer to the tangential axis Y, and thus the objective lens position detecting device can be advantageously provided on the lens holder without increasing the size of the lens holder viewed in the tracking direction X. That is to say, when the light shielding plate is secured to the lens holder 11 at the point R and is extended in the tracking direction X, the whole length of the lens holder viewed in the tracking direction X can be made short.

Figure 9:
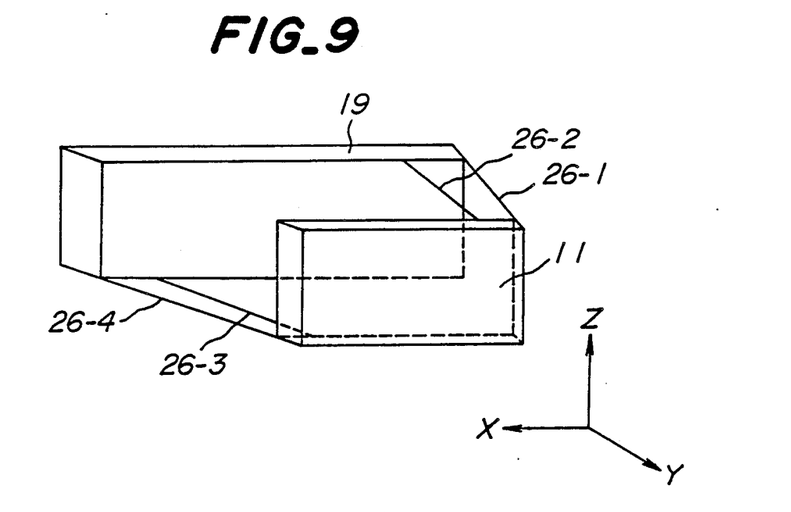
FIG. 9 is a schematic perspective view depicting the wire arrangement of a second embodiment of the objective lens supporting apparatus according to the invention.
Figure 10:
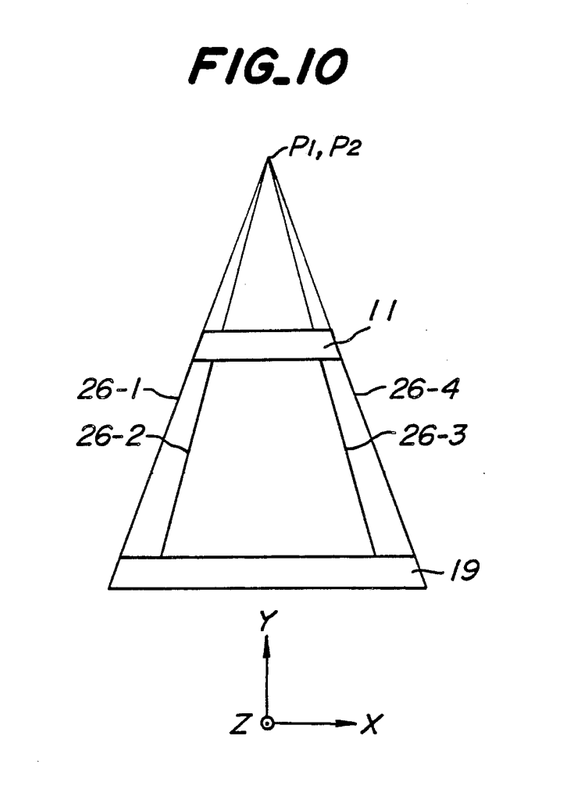
FIG. 10 is a schematic plan view showing the wires of FIG. 9.
Figure 11:
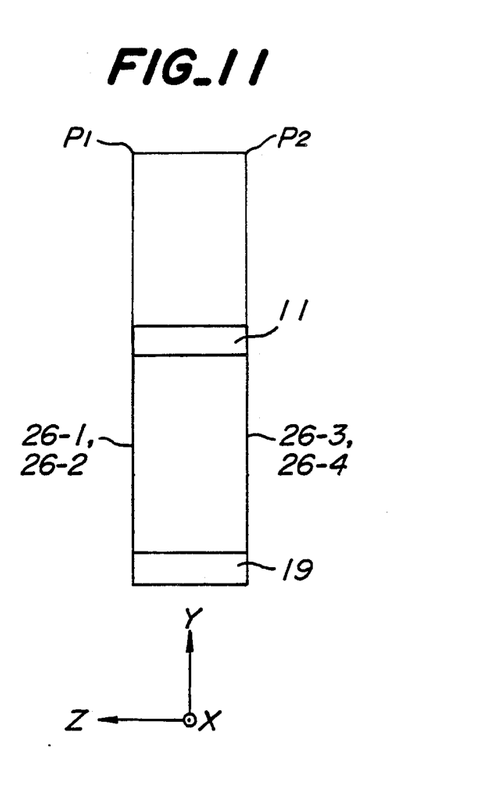
FIG. 11 is a schematic side view representing the wires of FIG. 9.

FIGS. 9, 10 and 11 show a second embodiment of the objective lens supporting apparatus according to the invention. In the present embodiment, a first pair of resilient wires 26-1 and 26-2 are arranged nearer to the record disc and a second pair of resilient wires 26-3 and 26-4 are arranged far from the record disc. One of the first pair of resilient wires 26-1 is arranged closer to the other wire 26-1 and one of the second pair of wires 26-3 is arranged closer to the other wire 26-4. That is to say, the wires 26-1 to 26-4 are arranged symmetrically with respect to the tangential axis Y. To the contrary, in the first embodiment shown in FIG. 3 the wires 18-1 to 18-4 are arranged symmetrically with respect to the YZ plane including the axes Y and Z.

Also in the second embodiment, extensions of the wires 26-1 and 26-2 intersect with each other at a point $P_1$ and extensions of the wires 26-3 and 26-4 intersect with each other at a point $P_2$, said points $P_1$ and $P_2$ being aligned in the focusing direction Z. As best show in FIG. 10, an apex angle $\theta_1$ of the wires 26-2 and 26-3 viewed in the focusing direction Z is smaller than that $\theta_2$ of the wires 26-1 and 26-4 viewed in the focusing direction Z.

In the second embodiment illustrated in FIGS. 9 to 11, the two wires 26-1 and 26-2 are arranged to be deflected toward one direction viewed in the tracking direction X and the two wires 26-3 and 26-4 are arranged to be deflected toward the opposite direction. In other words, the wires 26-1 and 26-2 are arranged on one side of the YZ plane, and the wires 26-3 and 26-4 are arranged on the other side of the YZ plane. Therefore, there can be obtained a large space between the lens holder 11 and the base member on the other side of the YZ plane. The lens position detecting device may be advantageously arranged in this large space without increasing the size of the pick-up in the tracking direction X.

Figure 12:
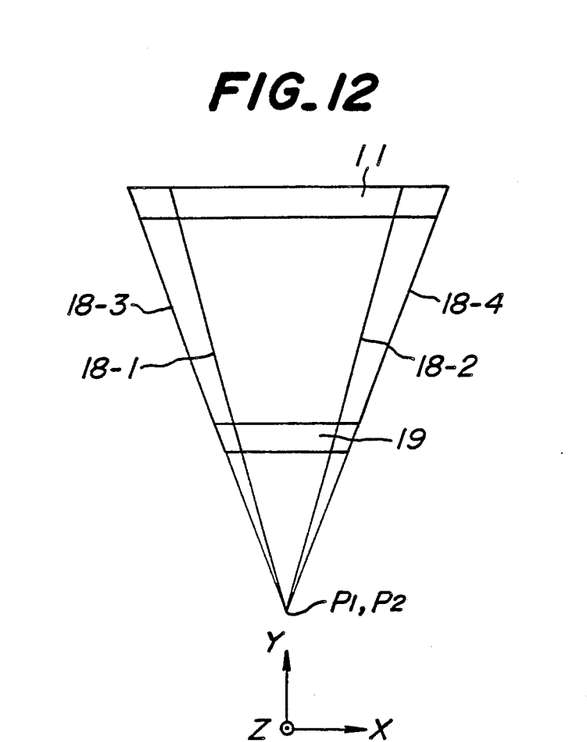
FIG. 12 is a schematic plan view illustrating the wire arrangement of a third embodiment of the objective lens supporting apparatus according to the invention.

FIG. 12 is a schematic plan view showing a third embodiment of the objective lens supporting apparatus according to the invention. This embodiment differs from the first embodiment in that the positions of the lens holder 11 and the stationary member 19 are exchanged with each other.

Figure 13:
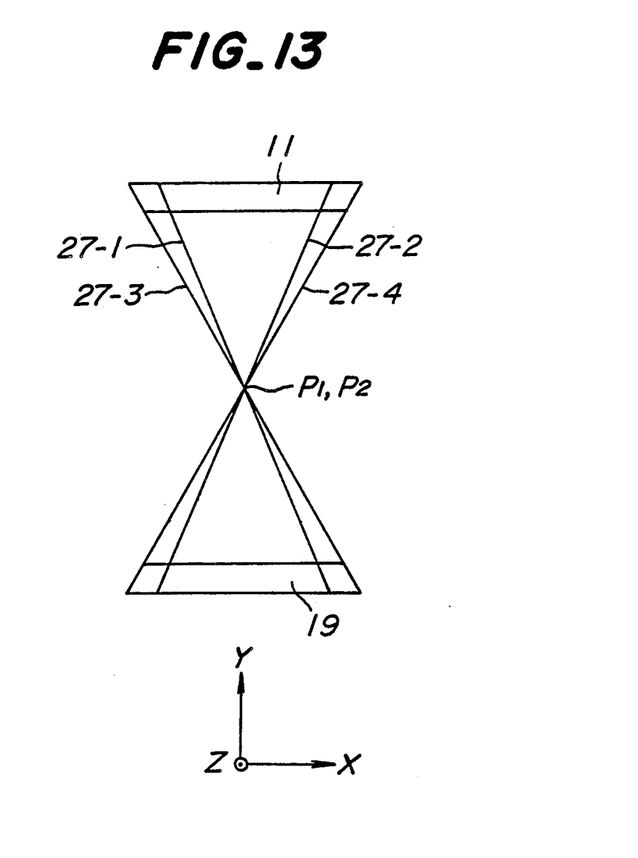
FIG. 13 is a schematic plan view showing the wire arrangement of a fourth embodiment of the objective lens supporting apparatus according to the present invention.

FIG. 13 is a schematic plan view illustrating a fourth embodiment of the objective lens supporting apparatus according to the invention. In this embodiment, a first pair of resilient wires 27-1 and 27-2 are arranged to intersect with each other at a point $P_1$ and a second pair of resilient wires 27-3 and 27-4 are arranged to intersect with each other at a point $P_2$, said points $P_1$ and $P_2$ being situated substantially at a middle point between the lens holder and the stationary member and being aligned with each other in the focusing direction Z. It should be noted that the wires 27-1; 27-3 and 27-2; 27-4 could not be actually crossed with each other at the points $P_1$ and $P_2$, but are slightly separated from each other in the focusing direction Z. However, this does not affect the property of the supporting apparatus and the objective lens can be moved in the tracking direction without causing undesired tilting motion. Further, the wires 27-1; 27-3 and 27-2; 27-4 may be connected with each other at the points $P_1$ and $P_2$, respectively by means of resilient coupling members. In such a case, the resilient coupling members will serve to give desired damping effect upon the wires.

Figure 14:
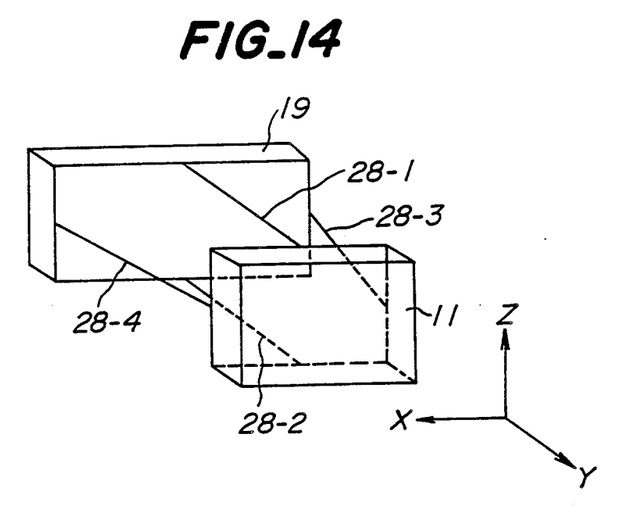
FIG. 14 is a schematic perspective view illustrating a fifth embodiment of the objective lens supporting apparatus according to the invention.
Figure 15:
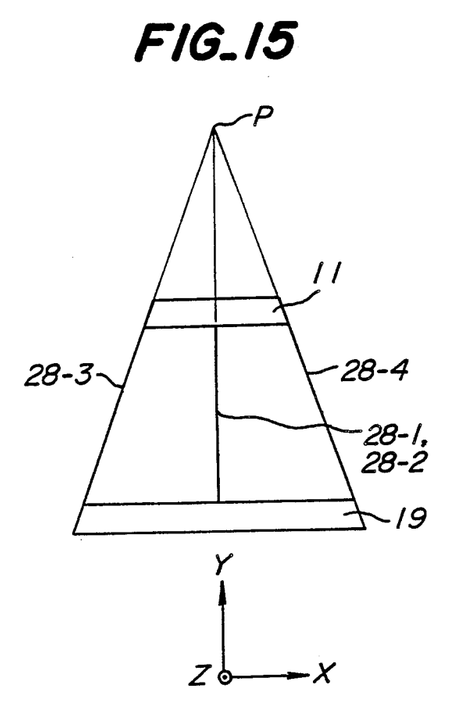
FIG. 15 is a schematic plan view of the wires of FIG. 14.
Figure 16:
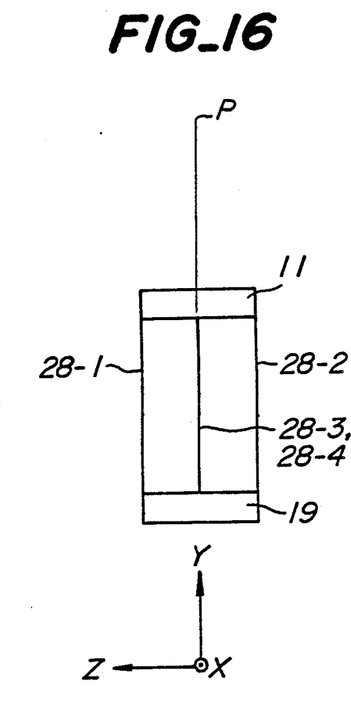
FIG. 16 is a schematic side view of the wires of FIG. 14.

FIG. 14 is a schematic perspective view showing a fifth embodiment of the objective lens supporting apparatus according to the invention, and FIGS. 15 and 16 are schematic plan and side views of the wire arrangement of FIG. 14. Resilient wires 28-1 and 28-2 are arranged in parallel with each other, but resilient wires 28-3 and 28-4 are not arranged in parallel with each other. Extensions of the wires 28-3 and 28-4 intersect with each other at a point P through which extensions of the wires 28-1 and 28-2 also pass. As shown in FIG. 16 all the wires 28-1 to 28-4 are in parallel with each other viewed in the tracking direction X. Also in this embodiment, the lens holder 11 is moved in the tracking direction X in a precise manner without causing undesired tilting motion about the tangential axis Y.

As explained above in detail, in the objective lens supporting apparatus according to the present invention, both the resilient wires of the first pair are arranged closer to the objective lens or one of the first pair of the wires is arranged near to the other wire, so that the optical pick-up can be moved much closer to the center of the optical record disc and thus the area on the record disc can be utilized to an optimal manner without causing any undesired contact of the wire with the turntable. Further, it is possible to obtain a large space between the lens holder and the stationary member, and therefore the lens position detecting device can be easily provided in this large space.

The present invention is not limited to the embodiments explained above, but many modifications and alternations may be conceived by those skilled in the art within the scope of the invention.

What is claimed is:

1. An apparatus for supporting an objective lens for projecting a light beam onto an object movably at least in first and second orthogonal directions comprising a lens holder to which the objective lens is secured such that an optical axis of the objective lens is aligned with said first direction;

a stationary member for supporting the lens holder; and a first pair of resilient wires and a second pair of resilient wires arranged between the lens holder and the stationary member, said first pair of resilient wires being arranged closer to said object than said second pair of resilient wires, said resilient wires being extended not in parallel with each other such that the resilient wires or extensions of the wires intersecting with each other at points which are aligned with each other in the first direction, and said resilient wires being arranged symmetrically with respect to a plane which includes the optical axis of the objective lens and is perpendicular to the second direction or with respect to an axis which is perpendicular both to the optical axis of the objective lens and the second direction.

2. An apparatus according to claim 1, wherein the resilient wires of the first pair are arranged in a first plane which is perpendicular to the optical axis of the objective lens and the resilient wires of the second pair are arranged in a second plane which is perpendicular to the optical axis of the objective lens and is separated from the first plane.

3. An apparatus according to claim 2, wherein the resilient wires of said first pair are arranged such that the extensions of these resilient wires make a first apex angle at a first point in the first plane, and the resilient wires of said second pair are arranged such that the extensions of these resilient wires make a second apex angle at a second point in the second plane, said first apex angle being smaller than said second apex angle.

4. An apparatus according to claim 2, wherein the resilient wires of the first pair are arranged on one side of said plane including the optical axis of the objective lens and being perpendicular to the second direction, and the resilient wires of the second pair are arranged on the other side of said plane.

5. An apparatus according to claim 4, wherein the resilient wires of the first and second pairs are arranged such that the extension of one of the resilient wires of the first pair and the extension of one of the resilient wires of the second pair make a first apex angle viewed in the first direction and the extension of the other of resilient wires of the first pair and the extension of the other of resilient wires of the second pair make a second apex angle viewed in the first direction, said first apex angle being smaller than said second apex angle.

6. An apparatus according to claim 2, wherein the resilient wires of the first pair are crossed with each other at a first point and the resilient wires of the second pair are crossed with each other at a second point, said first and second points being positioned substantially at a middle portion between the lens holder and the stationary member.

7. An apparatus according to claim 1, wherein the resilient wires of the first pair are arranged in parallel with each other viewed in the first and second directions and the resilient wires of the second pair are arranged in parallel with each other viewed in the second direction, extensions of the resilient wires of the first pair intersecting with each other at a point through which extensions of the resilient wires of the second pair pass.

8. An apparatus according to claim 1 for use in an optical data processing apparatus using an optical record disc on which a data signal is recorded or to be recorded along a circular track, wherein said first pair of resilient wires are arranged nearer to the optical record disc than said second pair of resilient wires, and said first and second pairs of resilient wires are arranged such that the first direction is aligned with a focusing direction and the second direction is aligned with a tracking direction.

* * * * *